(12) United States Patent
Sartori et al.

(10) Patent No.: US 6,583,091 B2
(45) Date of Patent: Jun. 24, 2003

(54) METHOD FOR INHIBITING CORROSION USING 4-SULFOPHTHALIC ACID

(75) Inventors: Guido Sartori, Milan (IT); David Craig Dalrymple, Bloomsbury, NJ (US); Saul Charles Blum, Edison, NJ (US); Liza Marie Monette, Whitehouse, NJ (US); Mohsen S. Yeganeh, Piscataway, NJ (US); Andreas Vogel, Steinfeld (DE)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/905,230

(22) Filed: Jul. 13, 2001

(65) Prior Publication Data

US 2003/0012684 A1 Jan. 16, 2003

(51) Int. Cl.$^7$ .................. C23F 11/04; C23F 11/10; C09K 15/12; B05D 1/00
(52) U.S. Cl. ............... 507/259; 507/263; 507/267; 507/939; 252/395; 252/406; 106/14.27; 106/14.29; 166/242.4; 166/902; 422/12; 422/17; 427/435
(58) Field of Search ................. 252/395, 396, 252/406, 407; 507/244, 247, 252, 255, 256, 259, 263, 267, 939; 106/14.13, 14.27, 14.29; 166/902, 242.4; 427/435; 422/12, 17, 7; 148/320

(56) References Cited

U.S. PATENT DOCUMENTS

| | | | |
|---|---|---|---|
| 3,730,485 A | 5/1973 | Strang et al. .................. 252/57 |
| 3,804,731 A | 4/1974 | Yanagida et al. .............. 204/58 |
| 4,256,862 A | 3/1981 | Binsack et al. .............. 525/534 |
| 4,375,391 A | 3/1983 | Kushida et al. ............... 204/35 |
| 4,941,994 A | 7/1990 | Zetlmeisl et al. ...... 252/389.23 |
| 5,552,085 A | 9/1996 | Babaian-Kibala et al. ...................... 252/389.23 |
| 5,565,042 A | 10/1996 | Sakurai et al. ............. 148/266 |
| 5,630,964 A | 5/1997 | Babaian-Kibala et al. ...................... 252/389.23 |
| 5,648,416 A * | 7/1997 | Miller et al. ................. 524/500 |

FOREIGN PATENT DOCUMENTS

| | | | |
|---|---|---|---|
| DE | 2038077 | 2/1972 | |
| DE | 2810462 A1 | 9/1979 | |
| DE | 4323907 A1 | 1/1995 | |
| DE | 195 39854 A1 | 4/1997 | ........... C23F/11/12 |
| GB | 8667 | 1/1907 | |
| GB | 8 09198 | 2/1959 | .......... C10M/91/00 |
| GB | 962048 | 6/1964 | |
| GB | 1023535 | 3/1966 | |

OTHER PUBLICATIONS

Knutsson, Trans. Inst. Met. Finish (1976) 54, Part 1, pp. 53–55.
JP57–126994 (Derwent)—AN 1982–77782E [37] WPIDS (DAIW–N) Daiwa Kasei Kenkyusho KK (Abstract).
JP52–030942 (ACS)—AN 1978: 13607 HCAPLUS, Furukawa Aluminum Co., Ltd., Japan (Abstract).
JP60–038417 (ACS)—AN 1985: 543475 HCAPLUS, Hitachi Chemical Co., Ltd., Japan (Abstract).
JP59–016984 (Derwent)—AN 1984–059354 [10] WPIDS, (KYMA) Katayama Kagaku Kogyo Kenkyush (Abstract).
JP54–008130 (Derwent)—AN 1979–16737B [09] WPIDS, (MITS–N) Mitsui Keikinzoku (Abstract).
JP07–157694 (ACS)—AN 1995: 773249 HCAPLUS, Nippon Ester Co. Ltd., Japan (Abstract).
JP10–310876 (ACS)—AN 1998: 758809 HCAPLUS, Toyobo Co., Ltd., Japan (Abstract).
Derwent–Acc–No: 1997–246344, corrosion inhibitors for liquid cooling lubricants–comprise phenole ester or ketone compounds which are nitrogen free, Geke et al., 1997.*

* cited by examiner

*Primary Examiner*—Joseph D. Anthony
(74) *Attorney, Agent, or Firm*—Linda M. Scuorzo

(57) ABSTRACT

The present invention relates to a method for inhibiting high temperature corrosion of corrosion prone metal surfaces by organic acid-containing petroleum streams by providing an effective corrosion-inhibiting amount of 4-sulfophthalic acid, typically up to 1000 wppm, to the metal surface.

4 Claims, No Drawings

METHOD FOR INHIBITING CORROSION USING 4-SULFOPHTHALIC ACID

FIELD OF THE INVENTION

The present invention relates to a process for inhibiting the high temperature corrosivity of petroleum oils.

BACKGROUND OF THE INVENTION

Whole crudes and crude fractions with acid, including high organic acid content such as those containing carboxylic acids, (e.g., naphthenic acids), are corrosive to the equipment used to distill, extract, transport and process the crudes. Solutions to this problem have included use of corrosion-resistant alloys for equipment, addition of corrosion inhibitors, or neutralization of the organic acids with various bases.

The installation of corrosion-resistant alloys is capital intensive, as alloys such as 304 and 316 stainless steels are several times the cost of carbon steel. The corrosion inhibitors solution is less capital intensive; however, costs can become an issue.

The effectiveness of phosphorus compounds against corrosion was discovered in 1906 (Coslett, British Patent 8,667 for phosphoric acid), and the use of these compounds is known for aqueous systems.

Additionally, organic polysulfides (Babaian-Kibala, U.S. Pat. No. 5,552,085), organic phosphites (Zetlmeisl, U.S. Pat. No. 4,941,994), and phosphate/phosphite esters (Babaian-Kibala, U.S. Pat. No. 5,630,964) have been to be effective in a hydrocarbon-rich phase against naphthenic acid corrosion. However, high oil solubility incurs the risk of distillate sidestream contamination by phosphorus. Furthermore, there is also concern for potential downstream impact of phosphorus such as the possibility of catalyst poisoning by phosphorus-containing compounds, and concerns for downstream units. These concerns preclude addition of such inhibitors to sidestreams subjected to catalytic processing. Also, since phosphorus can concentrate in the residuum, processing or product options for the latter may become limited.

There remains a continuing need to develop additional options for mitigating the corrosivity of acidic crudes that use phosphorus-free compounds. Applicants' invention addresses these needs.

SUMMARY OF THE INVENTION

An embodiment of the present invention is a method for inhibiting high temperature corrosion of corrosion prone metal surfaces caused by organic, typically naphthenic acids in petroleum streams by providing the metal surface with an effective corrosion-inhibiting amount of 4-sulfophthalic acid.

Another embodiment of the invention is a method to inhibit the high temperature corrosivity of an organic acid-containing petroleum stream or oil by providing a corrosion prone metal-containing surface to be exposed to the acid-containing petroleum stream with an effective, corrosion-inhibiting amount of 4-sulfophthalic acid at a temperature and under conditions sufficient to inhibit corrosion of the metal surface. The providing of the 4-sulfophthalic acid may be carried out in the presence of an acid containing petroleum stream and/or as a pretreatment of the corrosion prone metal surface before exposure to the organic acid-containing petroleum stream. Corrosion prone metal surfaces include iron and iron-containing metals such as iron alloys.

Another embodiment includes the products produced by the processes herein.

The present invention may suitably comprise, consist or consist essentially of the elements or steps disclosed and may be practiced in the absence of an element or step not disclosed.

DETAILED DESCRIPTION OF THE PREFERRED EMBODIMENTS

Some petroleum streams, contain acids, including organic acids such as naphthenic acids that contribute to high temperature corrosion of internal surfaces of refinery equipment. Organic acids generally fall within the category of naphthenic and other organic acids. Naphthenic acid is a generic term used to identify a mixture of organic carboxylic acids present in petroleum stocks. Naphthenic acids may be present either alone or in combination with other organic acids, such as phenols. Naphthenic acids alone or in combination with other organic acids can cause corrosion at high temperatures in non-aqueous or essentially non-aqueous (hydrocarbon) environments, i.e. at temperatures ranging from about 200° C. (392° F.) to 420° C. (790° F.). Inorganic acids also may be present. Inhibition of corrosion due to the organic acid content of such petroleum streams, is desirable in order to increase the corrosion resistance, and thus, useful life of internal (i.e., tube-side surfaces of reactors and other equipment having an external or shell side and an internal or tube side) metal surfaces of refinery equipment that are high temperature corrosion prone and are to be exposed to organic acid-containing petroleum streams at process conditions that result in corrosion of such internal surfaces. It is particularly desirable to provide for mitigation options that use phosphorus-free compounds as additives or inhibitors, since phosphorus can affect downstream catalysts and/or product quality. Examples of such equipment include heat exchanger surfaces, pipestill vessels, transfer lines and piping, and pumps. Examples of metal surfaces that may benefit from treatment are ferrous metals such as carbon steel and iron alloys.

The petroleum streams that can be treated herein are any organic acid-containing petroleum streams, including whole crudes and crude oil fractions. As used herein, the term whole crudes means unrefined, non-distilled crudes.

The 4-sulfophthalic acid is introduced in either a batch or continuous process to untreated (unadditized) petroleum oil. Additionally, or separately, the metal surface may also be preconditioned by adding to a low acidity petroleum feed an amount of 4-sulfophthalic acid effective to inhibit corrosion in the organic acid-containing petroleum oil to be treated before combination with the petroleum stream containing organic acids and blending them by techniques known in the industry. Additional effective amounts may be introduced into the organic acid-containing petroleum stream itself as needed to maintain corrosion inhibition. Desirably, a continuous dosing of 4-sulfophthalic acid to achieve and maintain the effective level of corrosion inhibition is delivered. Typically, a reduction corresponding to at least a fifty (50) percent corrosion rate reduction can be achieved. Thus, the additive/inhibitor acid may be introduced to the hydrocarbon-rich environment or phase and/or to the metal surface itself.

The 4-sulfophthalic acid is added in effective amounts, typically up to a total of 1000 wppm, more typically an effective amount of from about 10–100 wppm.

The effectiveness of corrosion inhibition is typically estimated in the laboratory by weight loss of metal coupons exposed to organic acids with and without 4-sulfophthalic acid present. The relative decrease in metal weight loss due to the presence of the corrosion inhibitor is a measure of the effectiveness of corrosion inhibition.

Naphthenic acid concentration in crude oil is determined by titration of the oil with KOH, until all acids have been neutralized. The concentration is reported in Total Acid Number (TAN) unit, i.e. mg of KOH needed to neutralize 1 gram of oil. It may be determined by titration according to ASTM D-664. Any acidic petroleum oil may be treated according to the present invention, for example, oils having an acid neutralization of about 0.5 mg. KOH/g. or greater.

The following examples illustrate the invention.

EXAMPLE 1

A 50% aqueous solution of 4-sulfophthalic acid was evaporated to dryness under house vacuum and then under pump vacuum.

The reaction apparatus consisted of a 500-ml round bottom flask under nitrogen atmosphere. 288.9 grams of Tufflo oil was put in the flask, then 15 mg of 4-sulfophthalic acid were added. The flask contents were brought to 300° C. and a carbon steel coupon with dimensions $7/16$ in.×$11/16$ in.×$1/8$ in. was immersed. Initial coupon weight was determined to be 4.7662 g. After an hour, 11.1 grams of naphthenic acids were added, giving a total acid number of 8 mg KOHJg. The oil was kept at 300° C. for an additional 4 hours. The coupon weighed 4.7653 g after this procedure, corresponding to a corrosion rate of 16 mils per year.

EXAMPLE 2 (COMPARATIVE)

The procedure was the same as in example 1, but without 4-sulfophthalic acid. The coupon was kept in oil at 300° C. for four hours. The weight loss corresponded to a corrosion rate of 480 mils per year. Thus, in Example 1, a 97% corrosion rate reduction was measured when 4-sulfophthalic acid was present versus Example 2 when this compound was absent.

EXAMPLE 3

The procedure was the same as in Example 1, and the amount of 4-sulfophthalic acid was 15 mg. The weight loss corresponded to a corrosion rate of 27 mils per year. Thus, in Example 3, a 93% corrosion rate reduction was measured when 4-sulfophthalic acid was present versus Example 2 when this compound was absent.

What is claimed is:

1. A process for inhibiting the corrosivity at high temperatures of from 200° C. to 420° C. of an organic acid-containing petroleum stream comprising: providing a corrosion-prone, metal-containing surface to be exposed to an organic acid-containing stream with an effective, corrosion-inhibiting amount of 4-sulfophthalic acid contained within said petroleum stream.

2. The process of claim 1, wherein the amount of 4-sulfophthalic acid is an effective amount of up to 1000 wppm.

3. The process of claim 1, wherein the process is carried out at a temperature ranging from about ambient to below the cracking temperature of the petroleum stream.

4. The process of claim 1, wherein the metal is an iron-containing metal.

* * * * *